March 5, 1929.  A. W. NORDGREN ET AL  1,704,146

BUMPER CONSTRUCTION

Original Filed Aug. 24, 1927

Witness
L. F. Sandberg

Inventors
Algot W. Nordgren & Gustav A. Burandt
by Bair & Freeman.  Attorneys

Patented Mar. 5, 1929.

1,704,146

UNITED STATES PATENT OFFICE.

ALGOT W. NORDGREN AND GUSTAV A. BURANDT, OF ST. PAUL, MINNESOTA, ASSIGNORS TO MARQUETTE MANUFACTURING COMPANY, OF ST. PAUL, MINNESOTA.

BUMPER CONSTRUCTION.

Application filed August 24, 1927, Serial No. 215,164. Renewed August 6, 1928.

The object of our invention is to provide a bumper construction peculiarly adapted for installation on the well known Whippet four or six cylinder cars.

It is our purpose in this connection, to provide a bumper construction providing a pair of tubular spaced bumper elements with clamping devices for connecting them together in spaced relation near their ends and curved supports extending from the respective clamp devices and inclined toward each other and connected together, one of said supports having an upwardly inclined member for attachment to the car frame.

With these and other objects in view, our invention consists in the construction, arrangement and combination of the various parts of our bumper construction, whereby the objects contemplated are attained, as hereinafter more fully set forth, pointed out in our claims and illustrated in the accompanying drawings, in which:

Figure 1:
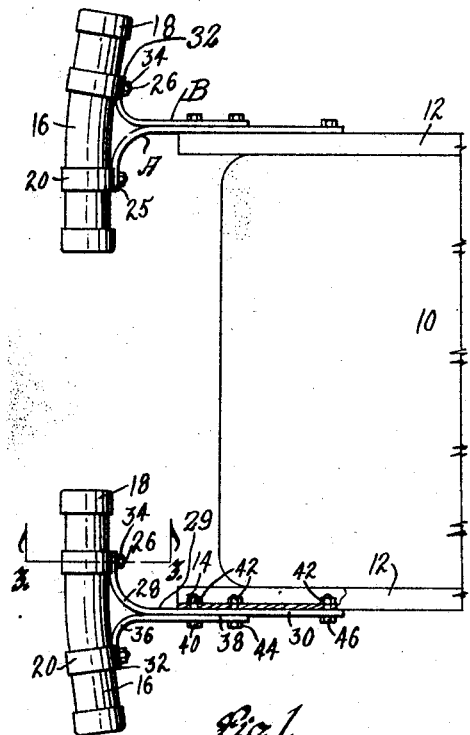
Figure 1 is a top or plan view of a pair of devices embodying our bumper construction, installed on the portion of a car shown.
Figure 3:
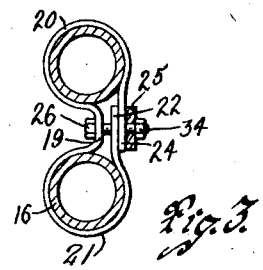
Figure 3 is a detail sectional view taken on the line 3—3 of Figure 1.

In the accompanying drawings, we have used the reference numeral 10 to indicate generally the rear portion of a car body. The chassis of the car has the side frame members 12 preferably in the form of channel bars, opening toward each other and having downwardly and inclined horns 14 at their rear ends.

Our bumper construction is what is commonly called "bumperettes" or "quarter bumpers" used for rear bumpers. Each bumper comprises a pair of tubular bumper elements 16 arranged in slightly spaced vertical relation. The bumper elements are provided at their ends with caps 18.

For fastening the bumper members together, we provide in the case of each bumper element, two fastening means one of which is arranged near each end of the bumper element 16. Each fastening device comprises a strip of metal bent to form a central upright portion 19 between the bumper elements 16.

From the portions 19, the metal is extended around the respective bumper members in rings 20 and 21. At the end of the ring 21 opposite the member 19, is an end portion 22 arranged adjacent to and parallel with the portion 19. At the end of the ring 20 opposite the portion 19, is an end portion 24 overlapping the end 22 and arranged parallel therewith.

Bolts 26 are extended through the member 19 and the ends 22 and 24 for supporting the bumper elements on the car. We provide in each instance, two supporting elements A and B. The supporting element A has an end portion as at 25 mounted on the inner end of the bolt 26 and curved therefrom laterally and outwardly and also toward the car as shown at 28 in Figure 1.

At the rear end of the portion 28 there is a portion 29 which is straight and at the rear end thereof, is a portion 30 inclined upwardly and forwardly with relation to the car.

The bumper support B has an end portion 32 connected to the outer bolt 26. The bolts 26 are provided with nuts 34.

The support B has a portion 36 curved away from the end 32 toward the portion 28 and then forwardly with relation to the car and terminating in a straight portion 38 parallel with the portion 29. The portions 29 and 38 are fastened together by means of a bolt 40 and nut 42.

Figure 2:
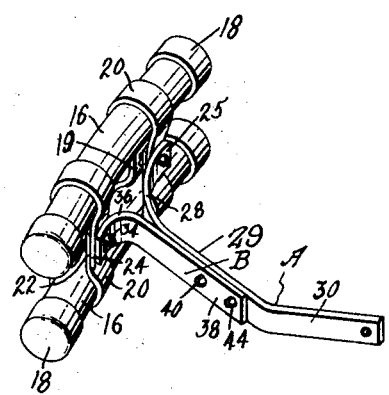
Figure 2 is a perspective view of one of the devices embodying our bumper construction.
Figure 4:
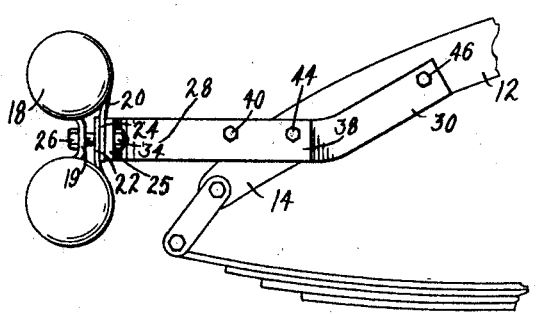
Figure 4 is a side elevation of one of the bumper devices installed upon an automobile frame.

Portions 38 and 29 are provided near the end of the portion 30 with a hole to receive a bolt 44. The portion 30 is provided with a hole to receive a bolt 46. The member or portion 30, inclines upwardly so as to follow generally speaking, the contour of the horn 14 as perhaps best illustrated in Figure 2.

The bolts 44 and 46 are extended through the horn 14 and are secured in place by means of nuts 42. There is thus provided a bumper constructiaon which is very simple to make and repair. It is also easy to install.

Each quarter bumper may be shipped as a unit with all parts asesmbled together so that all that need be done to install such a quarter bumper on the car, is to drill two holes in the horn and install the bolts 44 and 46.

The supports A and B form a rigid construction and yet in the ordinary metal used, there is such resiliency as to give some cushioning effect. These bumpers have a handsome appearance and afford ample protection to the fenders while affording also space between them for permitting convenient access to the spare tire.

Each quarter bumper has and gives the appearance of great strenght and rigidity.

We claim as our invention:

1. In a bumper construction of the class described, a pair of vertically spaced curved cylindrical bumper elements, means for connecting said bumper elements at their ends providing in each instance a vertical central portion, rings extending therefrom around the respective bumper elements and terminating in overlapping ends parallel with and adjacent to the central portion and bolts extended through said central portion and ends, a support having an end mounted on one of said bolts and curved forwardly and inwardly with relation to the car on which the device is to be installed and having a forward and straight portion terminating in an upwardly and forwardly inclined portion, a second support having an end mounted on the other bolt and a portion extending from said end and curved toward the other support and forwardly with relation to the car and terminating in a straight portion parallel with and adjacent to the straight portion of said first support, means for fastening said straight portions together and means for fastening said straight portions and said upwardly inclined portion to the frame of a car.

2. In a device of the class described, vertically spaced curved cylindrical bumper elements, means for fastening said bumper elements together at spaced points in their length and means for supporting said bumper elements on a car having a part inclined from its forward end downwardly and rearwardly and parts extending therefrom and curved laterally outwardly and inwardly to said respective first described means.

3. A bumper for automobiles comprising a pair of vertically spaced tubular bumper elements, spaced fastening means for connecting said bumper elements in spaced relationship and means for supporting said bumper elements on the frame of an automobile, said means including a pair of substantially similar opposed members each having parts connected to said fastening means and having parts connected together, one of said members being of greater length than the other and having connection with the automobile frame independent of the other of said members.

4. In a device of the class described, a pair of bumper elements, means for connecting said elements together near their respective ends comprising split rings integrally connected and having overlapping end portions, a pair of supports secured thereto at spaced points in the length of the bumper elements and curved toward each other and forwardly, having at their forward parts parallel adjacent portions, means for fastening said portions together, said portions having registering holes to receive a bolt whereby they may be secured together and fastened on a car.

5. In a device of the class described, a pair of vertically spaced cylindrical bumper elements, means for connecting said elements together near their respective ends comprising split rings integrally connected and having overlapping ends, a bolt extended through said ends and through the connecting member for the two rings, a pair of supports having portions mounted on said bolt and portions curving toward each other and forwardly and having at their forward portions parallel adjacent parts provided with pairs of registering holes, a bolt extended through one pair of said holes for fastening said parts together, the other pair of said holes being adapted to receive a bolt for fastening said parts together and supporting them on a car.

ALGOT W. NORDGREN.
GUSTAV A. BURANDT.